United States Patent
Metzler et al.

(10) Patent No.: US 12,499,671 B2
(45) Date of Patent: Dec. 16, 2025

(54) FILTERING REFLECTED POINTS IN A 3D LiDAR SCAN BY JOINT EVALUATION OF LiDAR DATA AND IMAGE DATA WITH A REFLECTION POINT CLASSIFIER

(71) Applicant: HEXAGON TECHNOLOGY CENTER GMBH, Heerbrugg (CH)

(72) Inventors: Bernhard Metzler, Dornbirn (AT); Reto Stutz, Au (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 139 days.

(21) Appl. No.: 18/389,543

(22) Filed: Nov. 14, 2023

(65) Prior Publication Data

US 2024/0161482 A1    May 16, 2024

(30) Foreign Application Priority Data

Nov. 14, 2022   (EP) .................................... 22207285

(51) Int. Cl.
| | | |
|---|---|---|
| *G06V 10/80* | (2022.01) | |
| *G01S 7/51* | (2006.01) | |
| *G01S 17/89* | (2020.01) | |
| *G06T 7/11* | (2017.01) | |
| *G06T 17/00* | (2006.01) | |
| *G06V 10/75* | (2022.01) | |

(52) U.S. Cl.
   CPC ............. *G06V 10/811* (2022.01); *G01S 7/51* (2013.01); *G01S 17/89* (2013.01); *G06T 7/11* (2017.01); *G06T 17/00* (2013.01); *G06V 10/75* (2022.01); *G06T 2200/24* (2013.01); *G06T 2207/10024* (2013.01); *G06T 2207/10028* (2013.01); *G06T 2207/20021* (2013.01); *G06T 2207/20081* (2013.01); *G06T 2207/20092* (2013.01); *G06T 2210/56* (2013.01)

(58) Field of Classification Search
   None
   See application file for complete search history.

(56) References Cited

U.S. PATENT DOCUMENTS

| | | | |
|---|---|---|---|
| 2019/0094021 A1* | 3/2019 | Singer | G01C 15/008 |
| 2020/0189463 A1* | 6/2020 | Kunz | B60W 40/06 |
| 2021/0026355 A1 | 1/2021 | Chen et al. | |
| 2021/0103763 A1 | 4/2021 | Fan et al. | |

(Continued)

OTHER PUBLICATIONS

Extended European Search Report dated Mar. 23, 2023 as received in Application No. 22207285.2.

*Primary Examiner* — Frank S Chen
(74) *Attorney, Agent, or Firm* — Maschoff Brennan (57) ABSTRACT

3D LiDAR scanning for generating a 3D point cloud of an environment, e.g. for surveying a construction side or for building surveying. Data points within the 3D laser scan data originating from multiple reflections within the environment, referred to as reflection points, are automatically identified and removed from the point cloud, by making use of a joined analysis of paired 3D laser scan data and image data captured with a measuring device. Points belonging to objects which appear in the 3D scan data but do not appear in the image data are classified as reflection points. Detection of the reflection points is provided by a reflection point classifier, which is trained to find semantic similarity and dissimilarity of 3D laser scan data and image data.

17 Claims, 5 Drawing Sheets

(56) References Cited

U.S. PATENT DOCUMENTS

2021/0158544 A1    5/2021   Steinmeyer et al.
2023/0136798 A1*   5/2023   Cao ........................ G01S 17/89
                                                                                  702/152

* cited by examiner

FILTERING REFLECTED POINTS IN A 3D LiDAR SCAN BY JOINT EVALUATION OF LiDAR DATA AND IMAGE DATA WITH A REFLECTION POINT CLASSIFIER

BACKGROUND

The present disclosure relates to 3D LiDAR scanning for generating a 3D point cloud of an environment, e.g. for surveying a construction side or for building surveying.

By way of example, 3D LiDAR scanning is of interest to craftsmen and architects to provide an actual condition and/or a construction progress of a room or a construction site, e.g. such that pending work can be scheduled. The environment is optically scanned and measured by using a laser scanner, and the 3D state of the environment is visualized by means of a visual display of a point cloud or a mesh model of the environment.

A common approach involves scanning of the environment by scanning a distance measurement beam, e.g. pulsed laser radiation, and determining emission angles and distances associated with echoes of the distance measurement beam. By way of example, distances are determined based on the so-called pulse transit time method, wherein an emission time and a reception time of an emitted and returning pulse are determined, e.g. by means of threshold detection or by precisely sampling the shape of the detected return pulse. Emission angles can be measured by precise angle encoders or based on a known deflection rate of a deflection element used for beam steering.

Typically, laser scanners have one or two mutually orthogonal axes of rotation, for example a vertical axis of rotation for a comparatively slow rotation of the entire laser scanner, often also referred to as "azimuth axis" or "slow axis", and a horizontal axis of rotation perpendicular thereto for a high-speed rotating beam deflection element. Due to the high rotation speeds of the beam deflection element frequently used, the second axis is also referred to as "the fast axis".

For measuring extended structures and environments, e.g. such as railway track systems, roads, tunnel systems or air fields, a translational motion of the entire laser scanner is often utilized in addition or instead of a rotation around the azimuth axis.

Nowadays increasingly standardized, laser scanners further comprise additional sensors, e.g. additional perception sensors such as visual and/or infrared cameras, and a position and orientation system, e.g. comprising a receiver for a global satellite navigation system, an inertial measurement unit, and tilt sensors. These additional sensors are arranged on the laser scanner and configured for providing additional information during an ongoing LiDAR scan, e.g. to provide position information for the scanner position and color information.

3D LiDAR scans can be corrupted in case the distance measurement beam is reflected multiple times within the environment. By way of example, in terrestrial laser scanning the horizontal and vertical angles of an emitted distance measurement beam are determined and associated to a measured distance under these angles. Thus, a point cloud is generated on the basis of the assumption, that a reflective object is at exactly these horizontal and vertical angles to the laser scanner. However, this assumption is not true in case the emitted beam is reflected multiple times within the environment. By way of example, in case the measurement beam hits a window and is reflected towards the ceiling and then back to the laser scanner (again via a reflection at the window), the combined distance from the scanner to the window plus the distance from the window to the reflected point on the ceiling is measured and associated to the horizontal and vertical emission angles. The computation of Cartesian coordinates thus leads to a virtual point located on the other side of the window.

Multiple point reflections prevent a clean appearance of the scan and, e.g. if multiple 3D LiDAR scans need to be registered to one common point cloud, these points make correct alignment of the point clouds difficult. Removal of reflection points is currently a tedious manual process. For example, a human user has to look at the generated point cloud and use his ability to perceive an object to be real or an artifact in order to manually select reflection points and remove them from the scan. Computer vision is not yet able to mimic the semantic perception ability of a human and thus, automation for identifying such reflected points within a point cloud is still challenging.

SUMMARY

It is therefore an object of the present disclosure to provide 3D LiDAR scanning which overcomes the problems of the prior art with respect to multiple reflected points.

A further object is to provide 3D LiDAR scanning which provides reduced time between data acquisition and data visualization.

A further object is to provide 3D LiDAR scanning which provides improved point cloud quality and a reduced number of outliers.

One aspect relates to providing improved automation to detect data points of the LiDAR data which originate from multiple reflections. This is achieved by a joined analysis of LiDAR and image data captured with a measuring device.

The disclosure relates to a method for generating a 3D point cloud from surveying data, wherein the surveying data comprise 3D laser scan data and image data. The method comprises providing of laser intensity data points and image intensity data points, wherein the laser intensity data points are based on intensity values provided by the 3D laser scan data and the image intensity data points are based on intensity values provided by the image data. By way of example, the laser intensity data points are free of intensity information from the image data and the image intensity data points are free of intensity information from the 3D laser scan data. The laser intensity data points and the image intensity data points are linked to one another if spatial points imaged by them are associated to a common viewing direction of the 3D laser scan data and the image data (underlying the laser intensity data point and the image intensity data point in question).

By way of example, surveying devices are often configured to provide the surveying data in a way that an assignment of image elements of the image data to data points of the 3D laser scan data is provided based on a correlation of a respective image element with a respective measurement angle underlying a respective data point of the 3D laser scan data.

The method further comprises processing each of the laser intensity data points with a comparison algorithm, wherein the comparison algorithm is configured to provide a laser intensity data point with a confidence value for a classification as to whether the laser intensity data point and an image intensity data point linked thereto represent the same object in the environment. The classification comprises an intensity comparison of laser intensity comparison points with image intensity comparison points. The laser intensity comparison points comprise the laser intensity data point and laser intensity data points associated with further viewing directions adjacent to the viewing direction of the laser intensity data point (e.g. the common viewing direction underlying the 3D laser scan data and linking the laser intensity data point with the image intensity data point). The image intensity comparison points comprise the image intensity data point linked to the laser intensity data point and image intensity data points associated with the further viewing directions.

In a further step, the method comprises selecting of data points from the 3D laser scan data to be used for generating the 3D point cloud as function of a threshold criterion for the confidence values.

By way of example, the surveying data originate from a laser scanner or a laser profiler as known in the fields of geodetic surveying, industrial measurement, and mobile mapping. For example, known devices for measuring 3D coordinates of surfaces by means of a scanning functionality are laser scanners, profilers or total stations such as the Leica RTC360, Leica BLK360, Leica Multi Station 50, Leica Pegasus:Backpack, Leica Pegasus:Two or the Leica BLK2GO. For mobile mapping, profilers are often mounted onto a car, a backpack, or roboter dog such as the Boston Dynamics Spot® or any other moving platform.

An exemplary workflow comprises the following steps: Acquisition of paired LiDAR and image data with a measuring system, e.g. a terrestrial laser scanner, a mobile mapping system, or a handheld scanner; Alignment of LiDAR and image data; Detection of reflections based on the joint evaluation of LiDAR data and image data with a trained reflection point classifier; and Postprocessing and removal of detected reflection points, wherein points belonging to objects which appear in the LiDAR scan, but do not appear in the image data, are classified as reflections and are removed automatically from the point cloud. By way of example, the detected reflected points can be deleted automatically or deleted manually by a user.

For example, the comparison algorithm is based on a fully convolutional network for pixel-wise semantic segmentation, e.g. such as U-Net, DeepLab, OCRNet. In practice, there will typically be a difference in intensity between a so-called camera image (based on the image intensity data points) and a so-called laser intensity frame (based on the laser intensity data points), e.g. due to differences in light source, wavelength, etc. However, the neural network is able to differentiate between these (intrinsic) differences to detect significant intensity differences indicative of the presence of a reflection point. By way of example, the output of the neural network is an image where each pixel value corresponds to a probability/confidence value that the corresponding measurement is a reflection point or not.

In a further embodiment, the intensity comparison comprises a pattern comparison of intensity patterns provided by the laser intensity comparison points and the image intensity comparison points, respectively.

In a further embodiment, the comparison algorithm is configured to associate an intensity difference and, for example, an intensity pattern difference, between the laser intensity comparison points and the image intensity comparison points to classification features, which provide indication whether the processed laser intensity data point can be assigned to an object appearing in both the 3D laser scan data and the image data.

In particular, the comparison algorithm is configured to be trained by machine learning to associate an intensity difference and, for example, an intensity pattern difference, between the laser intensity comparison points and the image intensity comparison points to classification features, which provide indication whether the processed laser intensity data point can be assigned to an object appearing in both the 3D laser scan data and the image data.

In a further embodiment, the method comprises the steps: visualizing data points of the 3D laser scan data as a function of the threshold criterion for the confidence values; accessing controller data providing an adjustment of the threshold criterion; and accessing threshold setting data providing a threshold criterion to be used as the threshold criterion for the selecting of the data points from the 3D laser scan data (for generating the 3D point cloud).

Thus, a user is given the opportunity to visually inspect a result of the identified data points originating from multiple reflections, to change the "aggressiveness" of reflection point detection (detection of LiDAR data points/3D laser scan data points originating from multiple reflections) defined by the threshold criterion, and to again inspect the impact of the changed aggressiveness.

For example, the user can configure the threshold criterion for the confidence values and visualize the result, before deleting the detected points. In case the threshold is high, the algorithm would delete only data points with a high probability that they originate from multiple reflections. If the threshold is low the algorithm would also delete data points with a small probability or originating from multiple reflections. For example, initially 80% confidence that a detected data point originates from multiple reflections is set and the user reduces the threshold to 20% in order to analyze the impact of the algorithm on this type of currently used data set.

In a further embodiment, the method comprises mapping of laser intensity values determined from the 3D laser scan data onto a grid that corresponds to a grid based on the image data, thereby generating a laser image frame and an image frame (the image frame being a frame based on the image data and providing the same grid than the laser image frame, e.g. a so-called camera image frame). The laser image frame and the image frame are then used for generating a multi-channel image, which, for example, is fed to the comparison algorithm, which is used for processing the multi-channel image to determine the confidence values. For example, often the image data comprise images with multiple color channels and the multi-channel image may thus comprise the laser image frame and one or multiple frames based on the color channels.

For example, the grid of the laser image frame and the grid of the image frame have the same image format and number of pixels.

In a further embodiment, the image data comprise images with different color channels, e.g. RGB color channels, and the multi-channel image comprises an image frame generated by converting the different color channels into a frame of a different color model, e.g. the HSL (hue, saturation, lightness) or HSV (hue, saturation, value) color model.

In a further embodiment, the method comprises using a surface classification algorithm based on machine learning to identify an area within the image data, which belongs to a surface class associated with a defined reflective property, and using the identified area within the image data to determine the confidence values. For example, the surface class is associated with at least one of a mirroring surface, a window, and an object edge.

In a further embodiment, the method comprises using the area within the image data which belongs to the surface class associated with the defined reflective property to generate a binary mask frame, and generating a further multi-channel image comprising the laser image frame, the image frame, and the binary mask frame. The further multi-channel image is processed by the comparison algorithm to determine the confidence values, wherein the comparison algorithm is configured to take into account a binary mask to learn to associate intensity differences, and optionally intensity pattern differences, to classification parameters of the classification.

In a further embodiment, the method comprises associating each of the laser intensity data points with at least one of: a distance determined from the 3D laser scan data; a number of pulse returns of pulses of a pulsed distance measuring beam for generating the 3D laser scan data; and a digitized waveform of a returning pulse of the distance measuring beam as additional data. The comparison algorithm is configured to take into account the additional data for determining the confidence value.

By way of example, the multi-channel image according to one of the embodiments described above and/or the further multi-channel image described above comprise/comprises an additional frame based on the additional data.

In a further embodiment, the method comprises generating a colored point cloud by using the 3D laser scan data and the image data, wherein the colored point cloud is provided by spatial parameters, a color parameter, and a parameter providing the laser intensity values. The colored point cloud is processed by the comparison algorithm to determine the confidence values. For example, the comparison algorithm is based on a neural network for point cloud segmentation, e.g. such as PointNet++, PointCNN, KPconv.

Typically, a terrestrial laser scanner captures a series of images in different directions in order to cover the 360° full dome. The detection of the reflected points can be applied to each image individually. Alternatively, the images can be combined to one panorama image and this can be augmented with LiDAR data and fed into comparison algorithm, e.g. a neural network. In other words, processing by the comparison algorithm to provide the confidence values may be based on separate processing of individual images of the image data, or processing by the comparison algorithm to provide the confidence values may be based on processing a panorama image providing a larger field of view as an individual image.

The disclosure further relates to a system for generating a 3D point cloud of an environment, wherein the system is configured to carry out the method of one of the embodiments described above. In order to do so, the system comprises a surveying device configured to provide surveying data comprising 3D laser scan data and image data. The system further comprises a computing unit configured
- to provide the laser intensity data points and the image intensity data points according to the step of providing laser intensity data points and image intensity data points of the method described above;
- to determine the confidence values according to the step described above about processing each of the laser intensity data points with a comparison algorithm; and
- to provide the selecting of the data points from the 3D laser scan data according to the step of selecting data points from the 3D laser scan data described above.

In one embodiment, the system comprises a display configured to visualize data points of the 3D laser scan data as a function of the threshold criterion for the confidence values, and a user interface configured to generate controller data providing an adjustment of the threshold criterion based on user input and to generate threshold setting data based on user input providing a threshold criterion to be used as the threshold criterion for the selecting of the data points.

By way of example, the display is configured as touch screen display and provides the user interface.

The disclosure further relates to a computer program product comprising program code which is stored on a machine-readable medium, or being embodied by an electromagnetic wave comprising a program code segment, wherein the program code comprises a comparison algorithm and has computer-executable instructions for performing, e.g. when run on a computing unit of a system as described above:
- providing laser intensity data points and image intensity data points from 3D laser scan data and from image data, wherein the laser intensity data points are based on intensity values provided by the 3D laser scan data and the image intensity data points are based on intensity values provided by the image data, wherein the laser intensity data points and the image intensity data points are linked to one another if spatial points imaged by them are associated to a common viewing direction of the 3D laser scan data and the image data;
- processing each of the laser intensity data points with the comparison algorithm, wherein the comparison algorithm is configured to provide a laser intensity data point with a confidence value for a classification as to whether the laser intensity data point and an image intensity data point linked thereto represent the same object in the environment, wherein the classification comprises an intensity comparison of laser intensity comparison points, which comprise the laser intensity data point and laser intensity data points associated with further viewing directions adjacent to the viewing direction of the laser intensity data point, with image intensity comparison points, which comprise the image intensity data point linked to the laser intensity data point and image intensity data points associated with the further viewing directions; and
- selecting data points from the 3D laser scan data to be used for generating a 3D point cloud as function of a threshold criterion for the confidence values.

In particular, the program code comprises computer-executable instructions for performing any step in the method according to one of the embodiments described above.

BRIEF DESCRIPTION OF THE DRAWINGS

The method, system, and computer program product according to the different aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
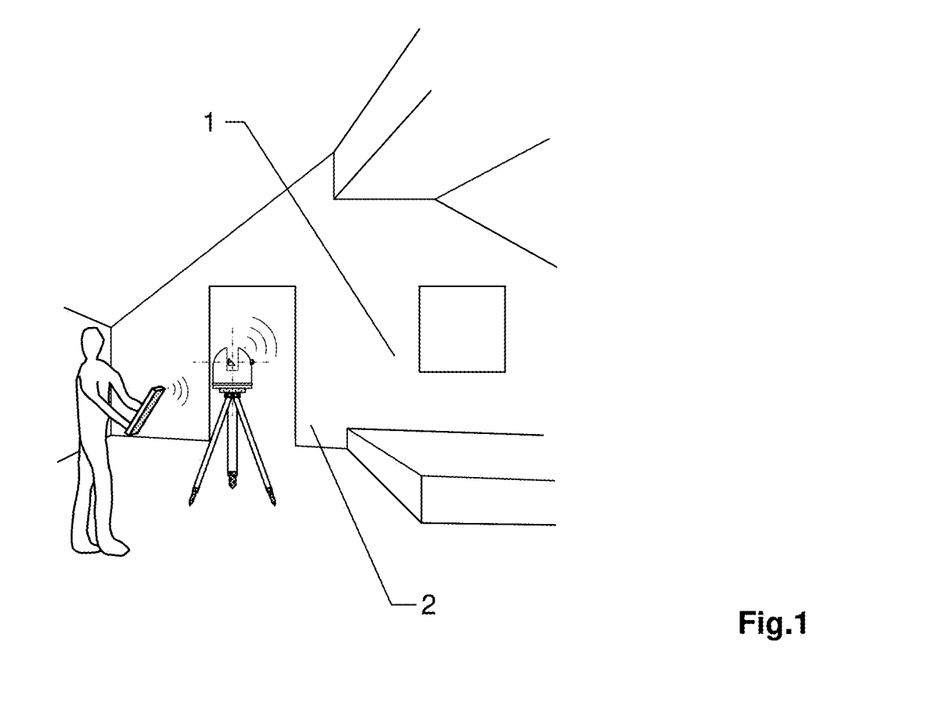
FIG. 1: an exemplary application of a 3D LiDAR scanning system.

FIG. 1 shows an exemplary application of a 3D LiDAR scanning system in the field of building construction. Here, a laser scanner 1 is used to capture the environment and to provide a user with an actual condition of a room under construction. The 3D state of the environment is visualized on a display 2, e.g. provided by a tablet or smartphone.

For example, display 2 is configured as touch screen display and provides the user with a slider to adjust the threshold criterion for the confidence values, while giving the user real time visual feedback on the impact of the adjustment on detected data points (allegedly) originating from multiple reflections within the environment. Here, for example, the display 2 is in wireless communication with the laser scanner 1.

Figure 2:
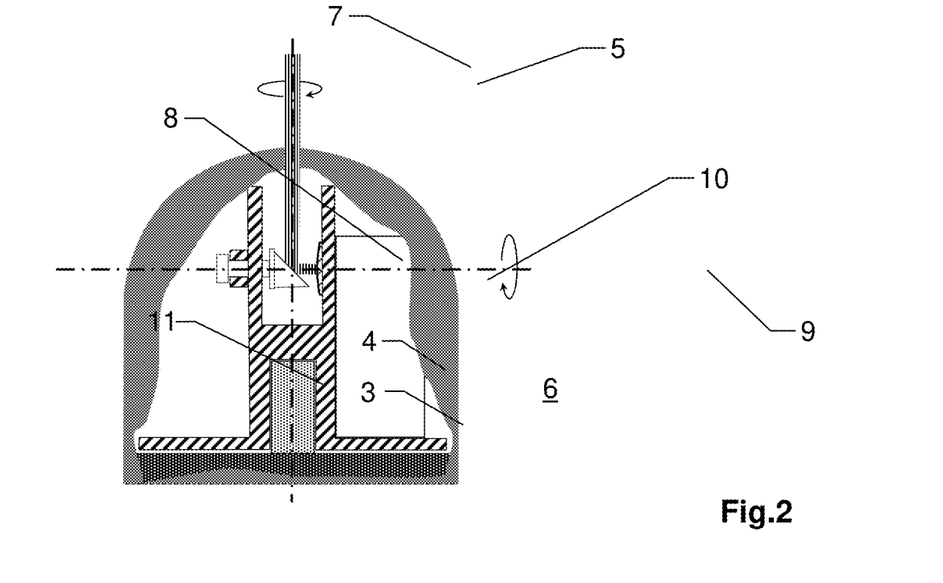
FIG. 2: an exemplary embodiment of a laser scanner to be used for carrying out the inventive method.

FIG. 2 depicts an exemplary embodiment of a laser scanner to be used for carrying out the inventive method. Here, the laser scanner is embodied in the form of a so-called two-axis laser scanner to be used for generating 3D laser scan data. The laser scanner comprises a base 3 and a support 4, the support 4 being rotatably mounted on the base 3 about the slow axis 5. Often the rotation of the support 4 about the slow axis 5 is also called azimuthal rotation, regardless of whether the laser scanner, or the slow axis 5, is aligned exactly vertically.

The core of the laser scanner is an optical distance measuring unit 6 arranged in the support 4 and configured to perform a distance measurement by emitting a pulsed laser beam 7, e.g. wherein the pulsed laser beam comprises 1.5 million pulses per second, and by detecting returning parts of the pulsed laser beam by means of a receiving unit comprising a photosensitive sensor. Thus, a pulse echo is received from a backscattering surface point of the environment, wherein a distance to the surface point can be derived based on at least one of the time of flight of the emitted pulse, the shape of a returning part of the pulse, and the phase of a returning part of the pulse.

The scanning movement of the laser beam 7 is carried out by rotating the support 4 relative to the base 3 about the slow axis 5 and by means of a rotating body 8, which is rotatably mounted on the support 4 and rotates about a so-called fast axis 9, here a horizontal axis. By way of example, both the transmitted laser beam 7 and the returning parts of the laser beam are deflected by means of a reflecting surface 10 integral with the rotating body 8 or applied to the rotating body 8. Alternatively, the transmitted laser radiation is coming from the side facing away from the reflecting surface, i.e. coming from the inside of the rotating body 8, and emitted into the environment via a passage area within the reflecting surface.

For the determination of the emission direction of the distance measuring beam 7 many different angle determining units are known in the prior art. For example, the emission direction may be detected by means of angle encoders, which are configured for the acquisition of angular data for the detection of absolute angular positions and/or relative angular changes of the support 4 or of the rotating body 8, respectively. Another possibility is to determine the angular positions of the support 4 or the rotating body 8, respectively, by only detecting full revolutions and using knowledge of the set rotation frequency.

By way of example, all rotating parts are arranged behind a cover 11, which is transparent for the distance measuring beam 7 and provides protection of mechanical and optical parts of the laser scanner.

A visualization of the data can be based on commonly known data processing steps and/or display options, e.g. wherein the acquired data is presented in the form of a 3D point cloud or wherein 3D vector file model is generated.

The laser scanner is configured to ensure a total field of view of the measuring operation of the laser scanner of 360 degrees in an azimuth direction defined by the rotation of the support 4 about the slow axis 5 and at least 130 degrees in a declination direction defined by the rotation of the rotating body 8 about the fast axis 9. In other words, regardless of the azimuth angle of the support 4 about the slow axis 5, the laser beam 7 can cover a so-called band field of view, in the figure a vertical field of view, spread in the declination direction with a spread angle of at least 130 degrees.

By way of example, the total field of view typically refers to a central reference point of the laser scanner defined by the intersection of the slow axis 5 with the fast axis 9.

Figure 3:
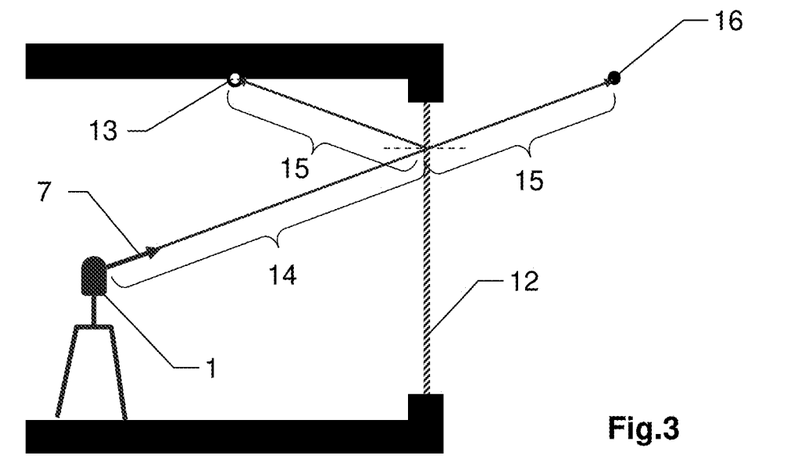
FIG. 3: exemplary situation where multiple reflections within the environment corrupt the 3D laser scan data.

FIG. 3 shows an exemplary situation where multiple reflections within the environment corrupt the 3D laser scan data. With an exemplary laser scanner 1 the horizontal angle, the vertical angle, and the distance are measured. As depicted by the figure the laser beam 7 is reflected by a window 12 towards a point on the ceiling 13, referred to as reflection point (a data point originating from multiple reflections within the environment) and reflected back to the laser scanner 1 (via the same path). Thus, the laser scanner 1 actually measures the distance to the ceiling point 13, which is the sum of the distance 14 from the scanner 1 to the window 12 and the distance 15 from the window 12 to the reflected point 13 on the ceiling. The computation of Cartesian coordinates, assuming the measured point being under the horizontal and the vertical angle relative to the laser scanner 1, leads to a virtual point 16 located on the other side of the window 12.

According to one aspect, the automatic detection of reflection points 13 is based on the information of the semantic similarity and dissimilarity of 3D laser scan data and image data. Camera sensors acquiring image data in the visible light wavelength can capture the content behind a specular surface to different extends depending on the material of the specular surface and lighting condition. Thus, the data captured with the camera and the LiDAR will contain different objects or patterns at the same location. For example in practice, particularly in the scanning of indoor scenes the camera can "see" through the window whereas the LiDAR intensity shows reflection points 13. One reason for this is a different location/origin of the light source for the different sensors. For example, for a camera capturing images towards a window, the light source is often located outside (e.g. sunlight), whereas for a laser scanner the light source is located inside (provided by the laser scanner itself).

Figure 4:
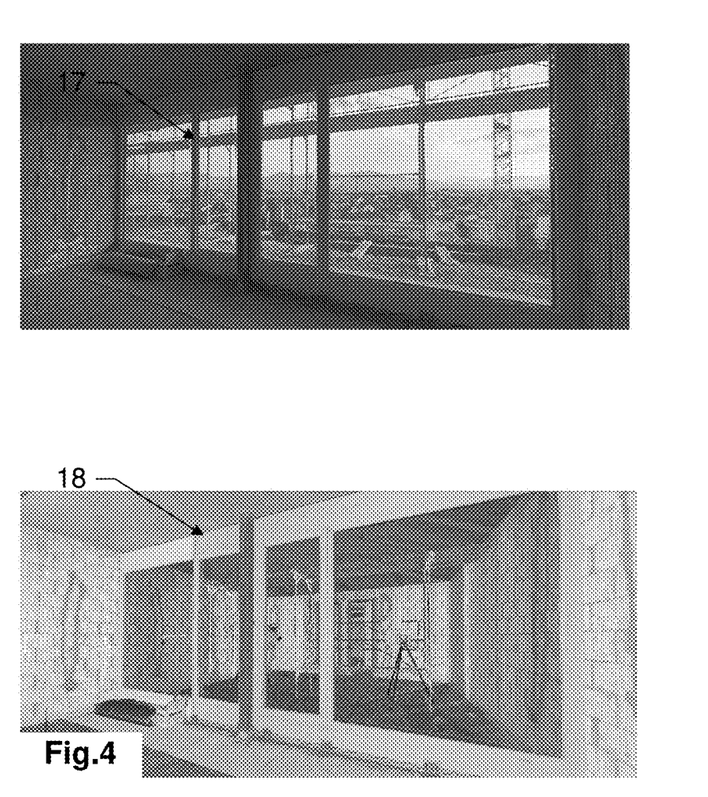
FIG. 4: a camera intensity image (top) and a corresponding laser intensity image (bottom) to illustrate the effect schematically described by FIG. 3.

FIG. 4 shows the effect schematically described by FIG. 3. The top of the figure shows a camera intensity image 17 and the bottom shows a corresponding laser intensity image 18 resulting from a mapping of LiDAR intensities to a pixel grid. In the area of the window, the camera intensity image 17 shows the outside scene, whereas the laser intensity image 18 shows reflections from the interior, e.g. walls, ceiling, and the laser scanner.

Figure 5:
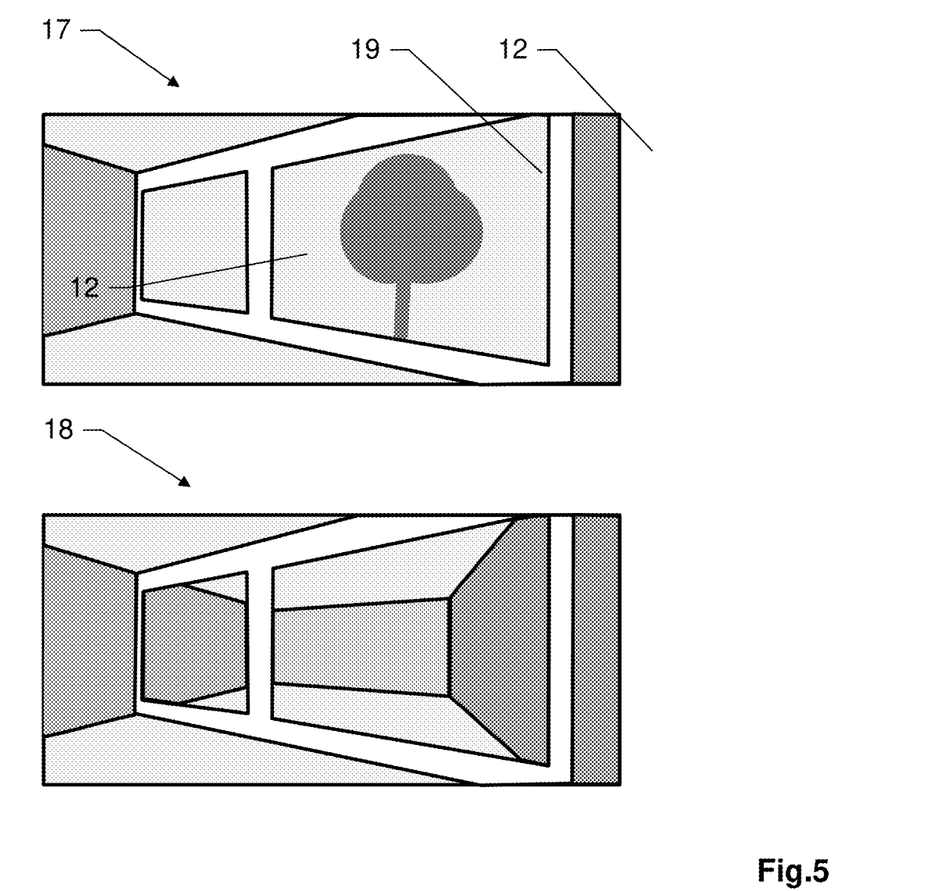
FIG. 5: a schematic camera intensity image (top) and a corresponding schematic laser intensity image (bottom) to illustrate the effect schematically described by FIG. 3.

FIG. 5 again schematically shows the effect described by FIG. 3, wherein the top of the figure schematically depicts a camera intensity image 17 towards a wall with two windows 12 and the bottom schematically depicts a corresponding laser intensity image 18. Here, the camera intensity image captures an outside tree 19, whereas the laser intensity image captures a mirroring of the interior.

Figure 6:
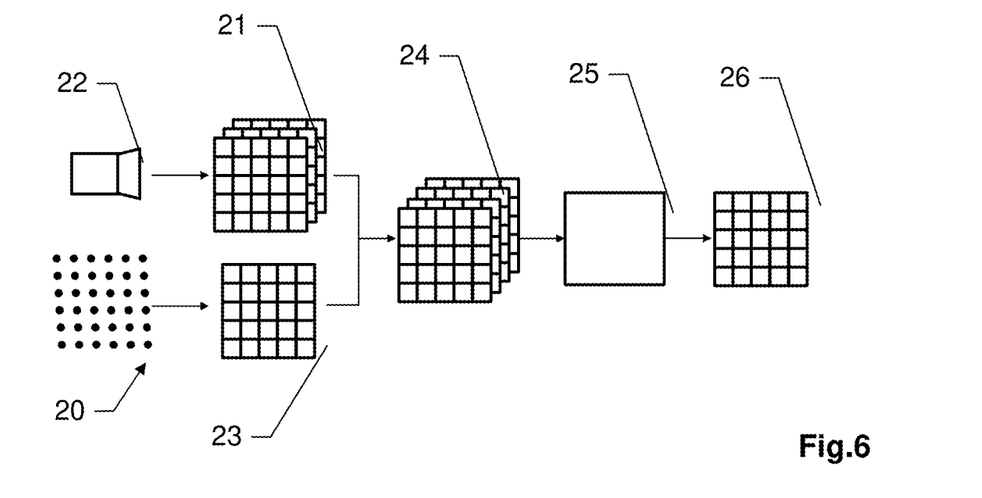
FIG. 6: schematically depicts a first embodiment of the inventive method.

FIG. 6 schematically depicts a first embodiment of the inventive method. The 3D laser scan data 20 is mapped onto a raster grid that corresponds to the raster of the camera data 21, here a 3-channel image (e.g. red, green, blue) generated by a color camera 22, thereby forming a laser intensity frame 23. The resulting laser intensity frame 23 is added to the 3-channel camera image 21 as fourth channel to generate a multi-channel image 24, which is then fed into a neural network 25, e.g. a convolutional neural network which predicts for each pixel whether it corresponds to a reflection point or not. In practice, there will typically be a difference in intensity between the camera image 21 and the laser intensity frame 23, e.g. due to differences in light source, wavelength, etc. However, the neural network 25 is able to differentiate between these (intrinsic) differences to detect significant intensity differences indicative of the presence of a reflection point.

By way of example, the output of the neural network 25 is an image 26 where each pixel value corresponds to a probability/confidence value that the corresponding measurement is a reflection point or not. Alternatively, the output of the neural network 25 is a binary image with values "0" (e.g. no reflection point) and "1" (e.g. reflection point), wherein information regarding confidence value is separately provided.

A threshold criterion is used to assess the detection result. By way of example, a threshold of 50% is applied, providing a value "0" if the predicted probability for the data point being a reflection point is below 50% and a value "1" if the predicted probability is larger than 50%.

For example, the comparison algorithm is a convolutional neural network, trained on a dataset containing labelled reflection points and real points. In particular, a fully-convolutional network for pixel-wise semantic segmentation is used, e.g. U-Net, DeepLab, OCRNet, etc.

In addition, to the LiDAR intensity, also other quantities derived from the LiDAR measurement can be added as additional channels to the multi-channel image 24, e.g. the measured distance, the number of returns, the digitized waveform of the returning laser pulse, etc. Input for the neural network 25 is then an image with five, six, or even more channels.

Alternatively, the RGB image can be converted into a different color format, e.g. HSV (hue, saturation, value) and combined with the laser intensity image to an image with the four channels hue, saturation, value, laser intensity.

Typically, a terrestrial laser scanner captures a series of images in different directions in order to cover the 360° full dome. The detection of the reflection points can be applied to each image individually. Alternatively, the images can be combined to one panorama image and this can be augmented with LiDAR data and fed into the neural network 24.

The detected reflection points 13 (FIG. 3) can then be deleted automatically or deleted manually by the user. Moreover, the user can configure the threshold of the probability and visualize the result, before deleting the detected points. In case the threshold is high, e.g. 80%, the algorithm would delete only points with a high probability that they are reflection points. However, if the threshold is low, e.g. 20%, the algorithm would also delete points with a small probability.

Figure 7:
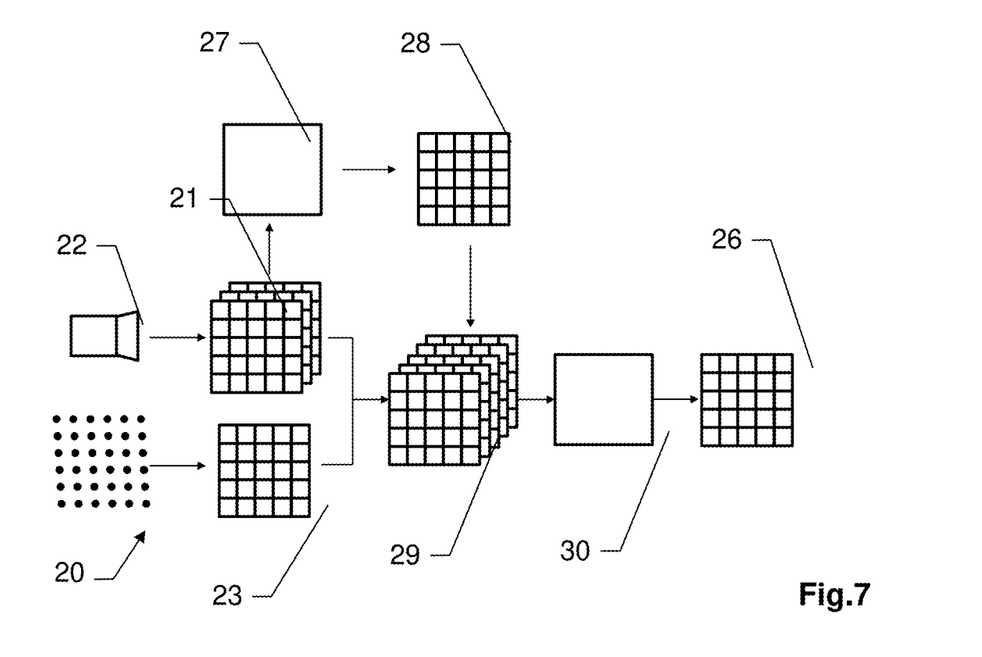
FIG. 7: schematically depicts a second embodiment of the inventive method.

FIG. 7 schematically depicts a second embodiment of the inventive method. Here, a first neural network 27 is applied on the (e.g. multi-channel) camera image 21 to segment reflecting objects or surfaces, e.g. windows, mirrors, etc., which results in a binary mask 28 of pixels that belong to a corresponding object or surface type. This binary mask 28 is then combined with the original camera image 21 and the laser intensity frame 23 to generate a multi-channel image 29, here a 5-channel image, which is fed into another neural network 30, e.g. a neural network as depicted by FIG. 6, in order to predict for each pixel whether it represents a reflection scan point or not.

Figure 8:
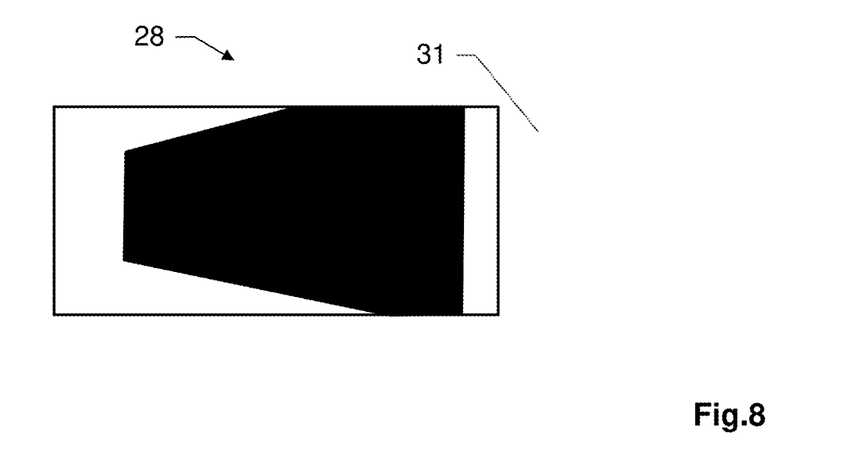
FIG. 8: exemplarily depicts a binary mask usable in the embodiment depicted by FIG. 7.

FIG. 8 exemplarily depicts a binary mask 28 usable in the embodiment depicted by FIG. 7, here in the form of an image with values "0" and "1" for identifying a specifically reflecting object 31, e.g. a window with glass and window frame.

Figure 9:
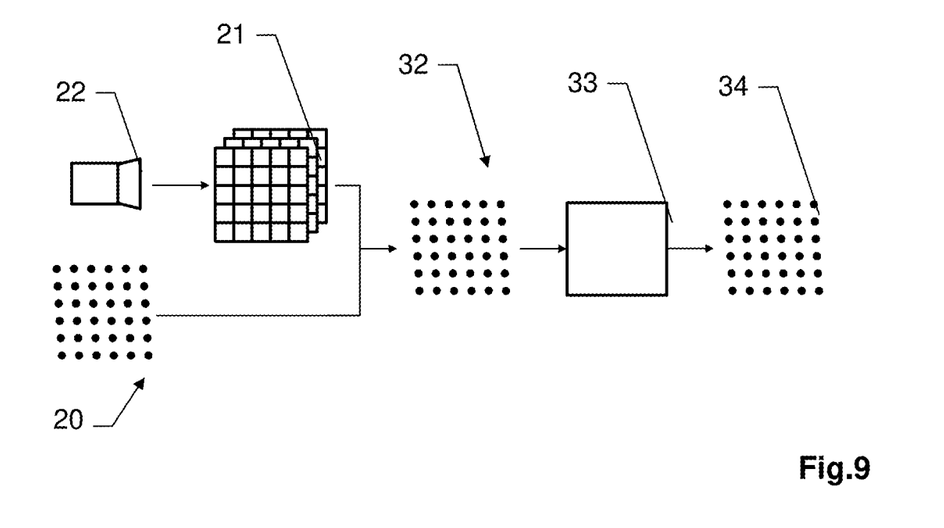
FIG. 9: schematically depicts a third embodiment of the inventive method.

FIG. 9 schematically depicts a third embodiment of the inventive method. Here, the 3D laser scan data 20 are represented by a point cloud of millions of points with Cartesian coordinates X, Y, Z and an intensity value I is colorized based on the camera image 21, e.g. a 3-channel RGB image. In this procedure a color value—e.g. a value for red, green, and blue—is assigned to each scan point resulting in a colored point cloud 32, e.g. with values (X, Y, Z, I, R, G, B). This point cloud 32 is fed into a neural network 33 that classifies for each point, whether it is a reflection point or not, thereby providing a point cloud 34 with binary labels, e.g. "1" for reflection point and "0" for no reflection point.

By way of example, a network for point cloud segmentation is used, e.g. PointNet++, PointCNN, KPconv, etc.

The feature vector for each point can also extended by additional values derived from the LiDAR measurement, e.g. the measured distance, the number of returns, the digitized waveform of the returning laser pulse, etc.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A method for generating a 3D point cloud from surveying data, wherein the surveying data comprise 3D laser scan data and image data, wherein the method comprises:

providing laser intensity data points and image intensity data points, wherein the laser intensity data points are based on intensity values provided by the 3D laser scan data and the image intensity data points are based on intensity values provided by the image data, wherein the laser intensity data points and the image intensity data points are linked to one another if spatial points imaged by them are associated to a common viewing direction of the 3D laser scan data and the image data, processing each of the laser intensity data points with a comparison algorithm, wherein the comparison algorithm is configured to provide a laser intensity data point with a confidence value for a classification as to whether the laser intensity data point and an image intensity data point linked thereto represent the same object in the environment, wherein the classification comprises an intensity comparison of laser intensity comparison points, which comprise the laser intensity data point and laser intensity data points associated with further viewing directions adjacent to the viewing direction of the laser intensity data point, with image intensity comparison points, which comprise the image intensity data point linked to the laser intensity data point and image intensity data points associated with the further viewing directions, and selecting data points from the 3D laser scan data to be used for generating the 3D point cloud as function of a threshold criterion for the confidence values.

2. The method according to claim 1, wherein the intensity comparison comprises a pattern comparison of intensity patterns provided by the laser intensity comparison points and the image intensity comparison points, respectively.

3. The method according to claim 2, wherein the comparison algorithm is configured to associate an intensity difference, and particularly an intensity pattern difference, between the laser intensity comparison points and the image intensity comparison points to classification features, which provide indication whether the processed laser intensity data point can be assigned to an object appearing in both the 3D laser scan data and the image data, wherein the comparison algorithm is configured to be trained by machine learning to associate an intensity difference, and particularly an intensity pattern difference, to classification features, which provide indication whether the processed laser intensity data point can be assigned to an object appearing in both the 3D laser scan data and the image data.

4. The method according to claim 1, wherein the method comprises visualizing data points of the 3D laser scan data as a function of the threshold criterion for the confidence values, accessing controller data providing an adjustment of the threshold criterion, and accessing threshold setting data providing a threshold criterion to be used as the threshold criterion for the selecting of the data points from the 3D laser scan data.

5. The method according to claim 1, wherein the method comprises mapping of laser intensity values determined from the 3D laser scan data onto a grid that corresponds to a grid based on the image data, thereby generating a laser image frame and an image frame, and generating a multi-channel image based on the laser image frame and the image frame.

6. The method according to claim 5, wherein the image data comprise images with different color channels and the multi-channel image comprises an image frame generated by converting the different color channels into a frame of a different color model, particularly the HSL or HSV color model.

7. The method according to claim 1, wherein the method comprises:

using a surface classification algorithm based on machine learning to identify an area within the image data, which belongs to a surface class associated with a defined reflective property, particularly wherein the surface class is associated with at least one of a mirroring surface, a window, and an object edge, and using the identified area within the image data to determine the confidence values.

8. The method according to claim 7, wherein the method comprises:

using the area within the image data which belongs to the surface class associated with the defined reflective property to generate a binary mask frame, generating a further multi-channel image comprising the laser image frame, the image frame, and the binary mask frame, and processing the further multi-channel image by the comparison algorithm to determine the confidence values, wherein the comparison algorithm is configured to take into account a binary mask to learn to associate intensity differences, and particularly intensity pattern differences, to classification parameters of the classification.

9. The method according to claim 1, wherein the method comprises associating each of the laser intensity data points with at least one of a distance determined from the 3D laser scan data, a number of pulse returns of pulses of a pulsed distance measuring beam for generating the 3D laser scan data, and a digitized waveform of a returning pulse of the distance measuring beam as additional data, wherein the comparison algorithm is configured to take into account the additional data for determining the confidence value, wherein a multi-channel image and/or a multi-channel image comprise an additional frame based on the additional data.

10. The method according to claim 1, wherein the method comprises:

generating a colored point cloud by using the 3D laser scan data and the image data, wherein the colored point cloud is provided by spatial parameters, a color parameter, and a parameter providing the laser intensity values, and processing the colored point cloud by the comparison algorithm to provide the confidence values, wherein the comparison algorithm is based on a neural network for point cloud segmentation.

11. The method according to claim 1, wherein the comparison algorithm is based on a fully convolutional network for pixel-wise semantic segmentation.

12. The method according to claim 1, wherein:

the processing of each of the laser intensity data points comprises separate processing of individual images of the image data, or the processing of each of the laser intensity data points comprises processing a panorama image providing a larger field of view as an individual image.

13. A system for generating a 3D point cloud of an environment, wherein the system is configured to carry out the method of claim 12, for which it comprises a surveying device configured to provide surveying data comprising 3D laser scan data and image data, and a computing unit configured to provide the laser intensity data points and the image intensity data points according to the step of providing laser intensity data points and image intensity data points, to determine the confidence values according to the step of processing each of the laser intensity data points with a comparison algorithm, and to provide the selecting of the data points from the 3D laser scan data according to the step of selecting data points from the 3D laser scan data.

14. A system for generating a 3D point cloud of an environment, wherein the system is configured to carry out the method of claim 1, for which it comprises a surveying device configured to provide surveying data comprising 3D laser scan data and image data, and a computing unit configured to provide the laser intensity data points and the image intensity data points according to the step of providing laser intensity data points and image intensity data points, to determine the confidence values according to the step of processing each of the laser intensity data points with a comparison algorithm, and to provide the selecting of the data points from the 3D laser scan data according to the step of selecting data points from the 3D laser scan data.

15. The system according to claim 14, wherein the system comprises a display configured to visualize data points of the 3D laser scan data as a function of the threshold criterion for the confidence values, and a user interface configured to generate controller data providing an adjustment of the threshold criterion based on user input and to generate threshold setting data based on user input providing a threshold criterion to be used as the threshold criterion for the selecting of the data points, wherein the display is configured as touch screen display and provides the user interface.

16. A computer program product comprising a non-transitory machine-readable medium having program code comprising a program code segment, wherein the program code comprises a comparison algorithm and has computer-executable instructions for performing, when run on a computing unit of a system according to claim 15:

providing laser intensity data points and image intensity data points from 3D laser scan data and from image data, wherein the laser intensity data points are based on intensity values provided by the 3D laser scan data and the image intensity data points are based on intensity values provided by the image data, wherein the laser intensity data points and the image intensity data points are linked to one another if spatial points imaged by them are associated to a common viewing direction of the 3D laser scan data and the image data, processing each of the laser intensity data points with the comparison algorithm, wherein the comparison algorithm is configured to provide a laser intensity data point with a confidence value for a classification as to whether the laser intensity data point and an image intensity data point linked thereto represent the same object in the environment, wherein the classification comprises an intensity comparison of laser intensity comparison points, which comprise the laser intensity data point and laser intensity data points associated with further viewing directions adjacent to the viewing direction of the laser intensity data point, with image intensity comparison points, which comprise the image intensity data point linked to the laser intensity data point and image intensity data points associated with the further viewing directions, and selecting data points from the 3D laser scan data to be used for generating a 3D point cloud as function of a threshold criterion for the confidence values.

17. A computer program product comprising a non-transitory machine-readable medium having program code comprising a program code segment, wherein the program code comprises a comparison algorithm and has computer-executable instructions for performing, when run on a computing unit of a system according to claim 14:

providing laser intensity data points and image intensity data points from 3D laser scan data and from image data, wherein the laser intensity data points are based on intensity values provided by the 3D laser scan data and the image intensity data points are based on intensity values provided by the image data, wherein the laser intensity data points and the image intensity data points are linked to one another if spatial points imaged by them are associated to a common viewing direction of the 3D laser scan data and the image data, processing each of the laser intensity data points with the comparison algorithm, wherein the comparison algorithm is configured to provide a laser intensity data point with a confidence value for a classification as to whether the laser intensity data point and an image intensity data point linked thereto represent the same object in the environment, wherein the classification comprises an intensity comparison of laser intensity comparison points, which comprise the laser intensity data point and laser intensity data points associated with further viewing directions adjacent to the viewing direction of the laser intensity data point, with image intensity comparison points, which comprise the image intensity data point linked to the laser intensity data point and image intensity data points associated with the further viewing directions, and selecting data points from the 3D laser scan data to be used for generating a 3D point cloud as function of a threshold criterion for the confidence values.

\* \* \* \* \*